(12) United States Patent
Oslick

(10) Patent No.: US 6,234,056 B1
(45) Date of Patent: May 22, 2001

(54) RECIPROCATING RESAW

(76) Inventor: Harvey Raymond Oslick, 3276 Micael Dr., Marina, CA (US) 93933-2415

( * ) Notice: Subject to any disclaimer, the term of this patent is extended or adjusted under 35 U.S.C. 154(b) by 0 days.

(21) Appl. No.: 09/447,702

(22) Filed: Nov. 23, 1999

Related U.S. Application Data

(60) Provisional application No. 60/140,738, filed on Jun. 25, 1999.

(51) Int. Cl.[7] .............................. B26D 7/06; B27B 19/00
(52) U.S. Cl. .............................. 83/444; 83/783; 83/784; 144/253.1
(58) Field of Search .................... 83/581.1, 444, 83/613, 626, 753, 758, 783, 786, 784; 144/250.12, 250.15, 253.1, 253.5, 253.6, 253.7

(56) References Cited

U.S. PATENT DOCUMENTS

| | | | | |
|---|---|---|---|---|
| 109,060 | * | 11/1870 | Schilling | 83/784 |
| 4,670,986 | * | 6/1987 | Chen | 83/783 |
| 5,301,726 | * | 4/1994 | Wojcik | 144/253.1 |
| 5,452,752 | * | 9/1995 | Aigner | 144/253.1 |

FOREIGN PATENT DOCUMENTS

| | | | | |
|---|---|---|---|---|
| 138331 | * | 8/1950 | (AU) | 83/783 |

* cited by examiner

Primary Examiner—W. Donald Bray

(57) ABSTRACT

A saw having a fence assembly (FIG. 4) which is adjustable in position to set cutting thickness with a means of securing said fence assembly to a base (10). The fence assembly consists of a lower fence (20), an upper fence (30), an upper outer fence (38), and a lower outer fence (44) that, together with the base, brackets, and fasteners, restrains a work piece except for motion in-line with the cutting direction. A reciprocating blade (60) that passes through a hole in base (10) is held in a blade support assembly (FIG. 5) that provides a means to tension the blade and holding the blade at proper alignment. Bearings and supports hold the blade assembly in-place relative to the base except for reciprocating motion. A source of reciprocating motion is connected to the blade support assembly. An adjustable brace (84) is set a height just above the work piece, thereby restraining the cut pieces from upward motion.

19 Claims, 5 Drawing Sheets

RECIPROCATING RESAW

CROSS-REFERNCE TO RELATED APPLICATIONS

This application is entitled to the benefit of Provisional Patent Application Ser. No. 60/140,738 filed Jun. 25, 1999, Reciprocating resaw for cutting boards of lumber into thinner boards or veneer of the same width and length as the original board.

STATEMENT REGARDING FEDERALLY SPONSERED RESEARCH OR DEVELOPMENT

Not applicable.

REFERENCE TO A MICROFICHE APPENDIX

Not applicable.

BACKGROUND OF THE INVENTION

This invention is a woodworking tool for the purpose of cutting boards of lumber into thinner boards or for cutting veneer from boards.

Prior art generally required the use of a band saw to perform this function. Another type of tool that is referred to as a resaw uses circular blades to produce boards of lumber from large stock, a purpose distinctly different than that for which my invention is intended. Reciprocating breaking-down saws are also used to produce boards from large stock. Planers result in a great deal of wasted wood to produce thinner boards. Band saws large enough to cut through the width of wide boards are expensive. In order to use a band saw to resaw, a time consuming process of installing a deep blade is necessary if the saw had been set up for curve cutting. Additionally, band saws often have a tendency to bind due poor blade tracking. Band saws require expensive, difficult to adjust, blade guide assemblies to maintain blade alignment and require expensive mechanisms to tension and track the blade using blade wheels. Fence configurations that have been developed to hold boards vertically do not provide complete positive control of board alignment through the cutting process. Cutting of a long board into thinner boards with a band saw also requires additional in-feed and out-feed tables to support the work pieces.

Prior art reciprocating scroll saws with blades secured at both ends are not designed to cut through the width of wide boards and are not provided with fence systems to allow this function. Many reciprocating saws such as scroll saws and power hacksaws are configured so that the depth of cut is limited to the distance between the blade and the support. When the direction of cut is not toward the support, allowing an unlimited cutting depth, the support is required to transfer a moment, thereby, tending to misalign the blade.

Resawing lumber in the manner performed by this invention is a process that is becoming more important with the rising cost of wood. Use of this invention will allow woodworkers to use materials that would otherwise be wasted. This invention will provide woodworkers with a simple to operate tool with capabilities to resaw and slice veneer, processes that are difficult using prior art. This invention is a tool that can be manufactured at a reasonable price that can be used to resaw lumber.

BRIEF SUMMARY OF THE INVENTION

A resaw comprising of:

(a) a base having an adjustable fence system securable to the base that restrains the work piece from motion except in line with the cutting direction;

(b) a blade assembly holding a straight, thin, deep, highly tensioned blade having two supports thereby preventing a tendency for the blade to rotate about a single support and allowing an unlimited depth of cut;

(c) an adjustable brace connected to the base to hold down the work piece after being cut.

OBJECTS AND ADVANTAGES

Accordingly, several objects and advantages of this invention are:

(a) to provide a relatively inexpensive and convenient tool capable of cutting through the width of wide boards in order to produce thinner boards or veneer with minimal waste;

(b) to provide a tool that is easy to set up and adjust to accurately cut uniform thinner boards or veneer from wide boards;

(c) to provide a fence and support system that provides positive control of the work piece being cut, restraining both long and short boards from tilting, skewing, and motion in the oscillating direction of the blade;

(d) to provide a blade assembly with a highly tensioned, thin, wide (deep) blade that remains aligned while cutting using reciprocating motion.

Further objects and advantages of this invention will become apparent from a consideration of the drawings and ensuing description.

Figure 1:
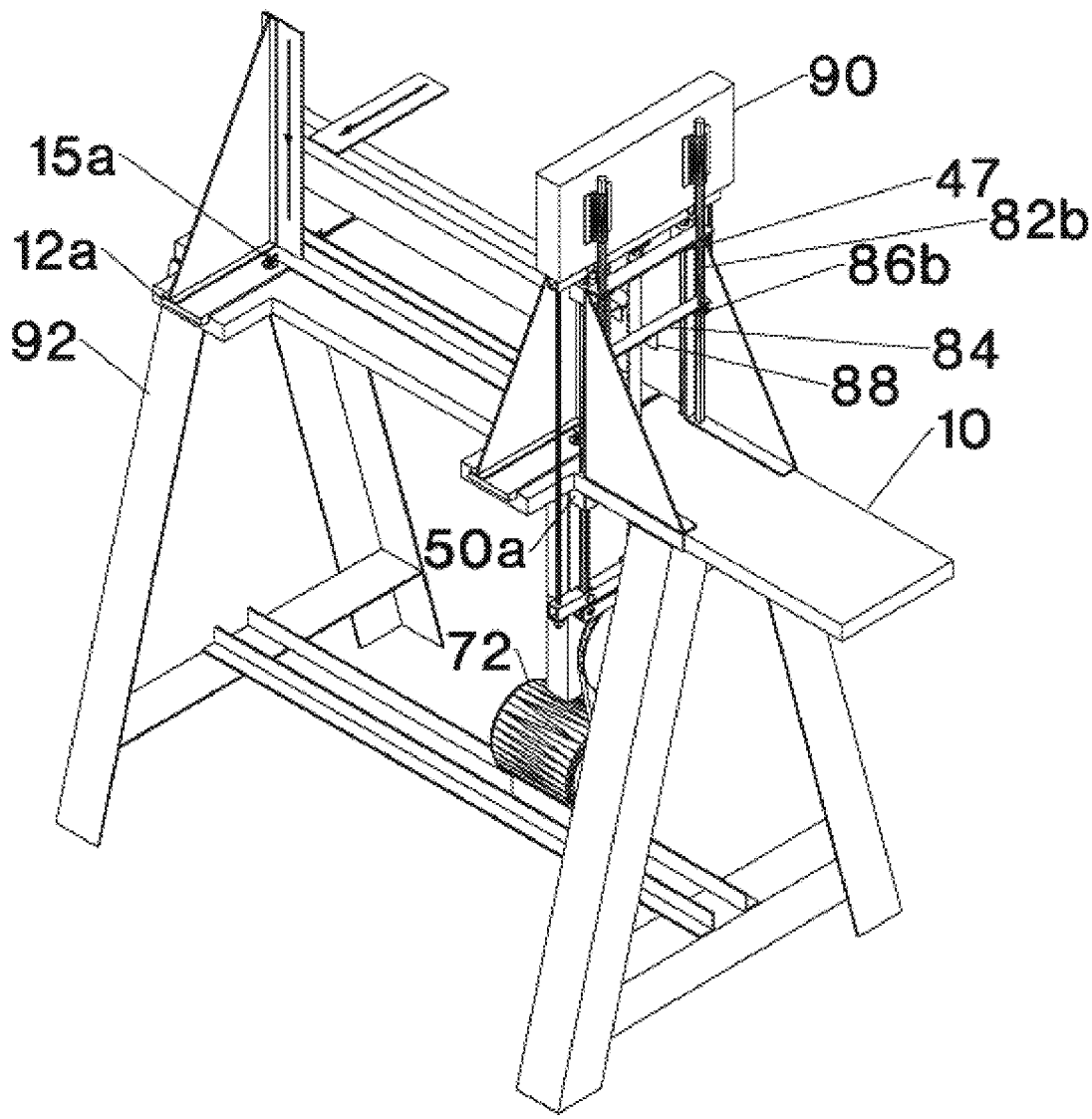
FIG. 1 shows an isometric view of this invention.

| Reference Numerals in Drawings | |
|---|---|
| 10 | Base |
| 12a,b | Fence assembly slides |
| 14a,b | Fence assembly slide locking bolts |
| 15a,b | Fence assembly slide locking nuts |
| 16a,b | Fence assembly slide locking bolt slots |
| 18a,b | Fence assembly grooves |
| 20 | Lower Fence |
| 22a,b | Fence support brackets |
| 24a,b | Upper fence supports |
| 26a,b | Upper fence height adjustment slots |
| 28a,b | Upper fence height adjustment screws |
| 30 | Upper fence |
| 32a,b | Upper outer fence supports |
| 34a,b | Upper outer fence adjustment slots |
| 36a,b | Upper outer fence adjustment screws |
| 38 | Upper outer fence |
| 40a,b | Lower outer fence locking bolt grooves |
| 42a,b | Lower outer fence locking bolts |
| 43a,b | Lower outer fence locking nuts |
| 44 | Lower outer fence |
| 46a,b | Bearing supports |
| 47 | Bearing support brace |
| 48a,b | Upper bearings |
| 50a,b | Lower bearings |
| 52a,b | Blade support assembly posts |
| 54 | Upper blade support |

-continued

Reference Numerals in Drawings

| | |
|---|---|
| 56a,b | Lower blade supports |
| 58a,b,c,d | Blade brackets |
| 59 | Blade opening |
| 60 | Blade |
| 62a,b | Blade locking bolts |
| 63a,b | Blade locking nuts |
| 64a,b,c,d | Blade support assembly pins |
| 66a,b | Blade tensioning rods |
| 68a,b,c,d | Blade tensioning nuts |
| 70 | Blade assembly drive brace |
| 72 | Motor |
| 74 | Belt |
| 76 | Cam assembly |
| 78 | Pivot arm |
| 80 | Camshaft bearing support |
| 82a,b | After-cut support posts |
| 84 | After-cut support brace |
| 86a,b | After-cut support brace locking screws |
| 88 | After-cut separator |
| 90 | Guard |
| 92 | Stand |

DETAILED DESCRIPTION OF THE INVENTION

Fence Assembly

Figure 2:
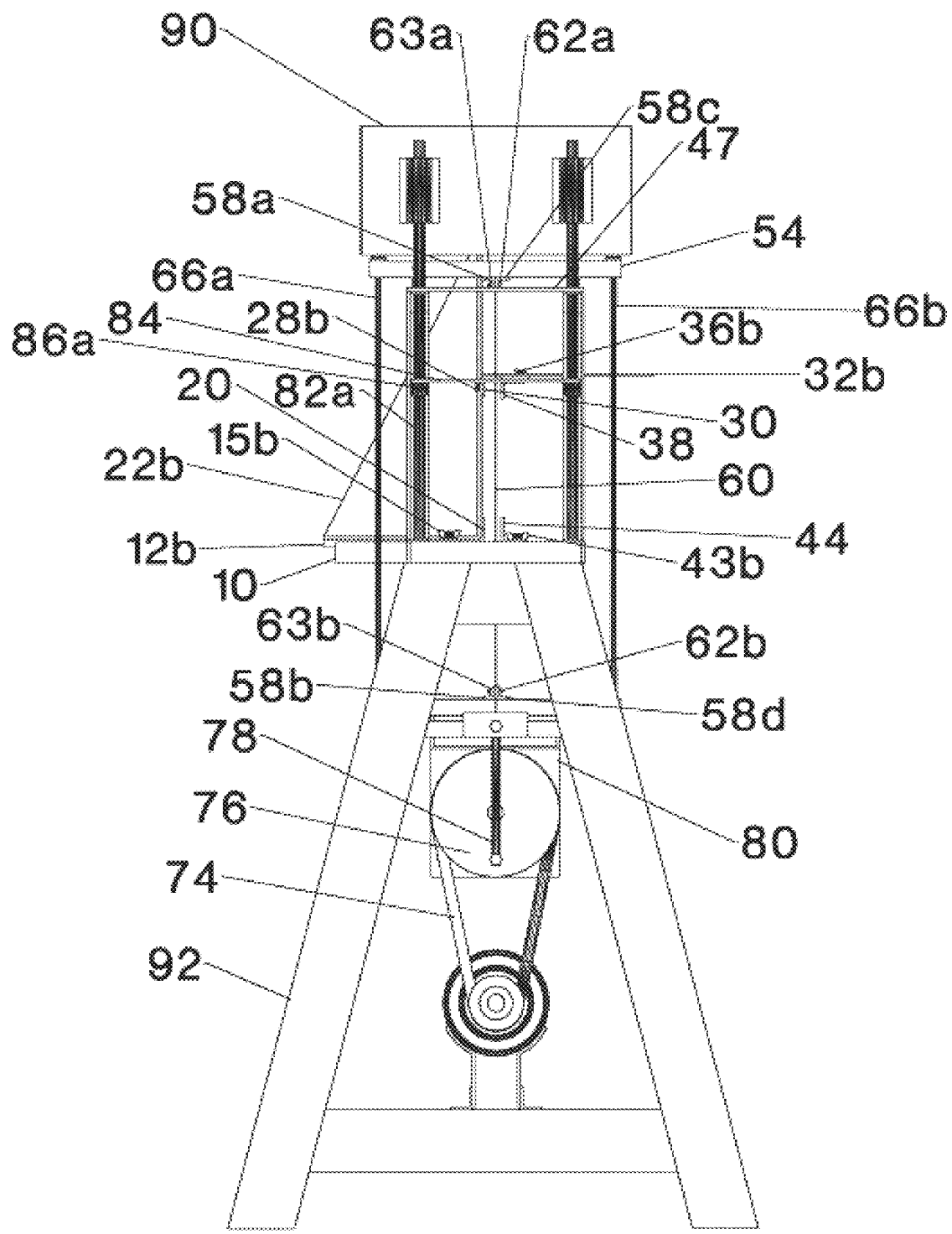
FIG. 2 shows an end view of this invention.
Figure 3:
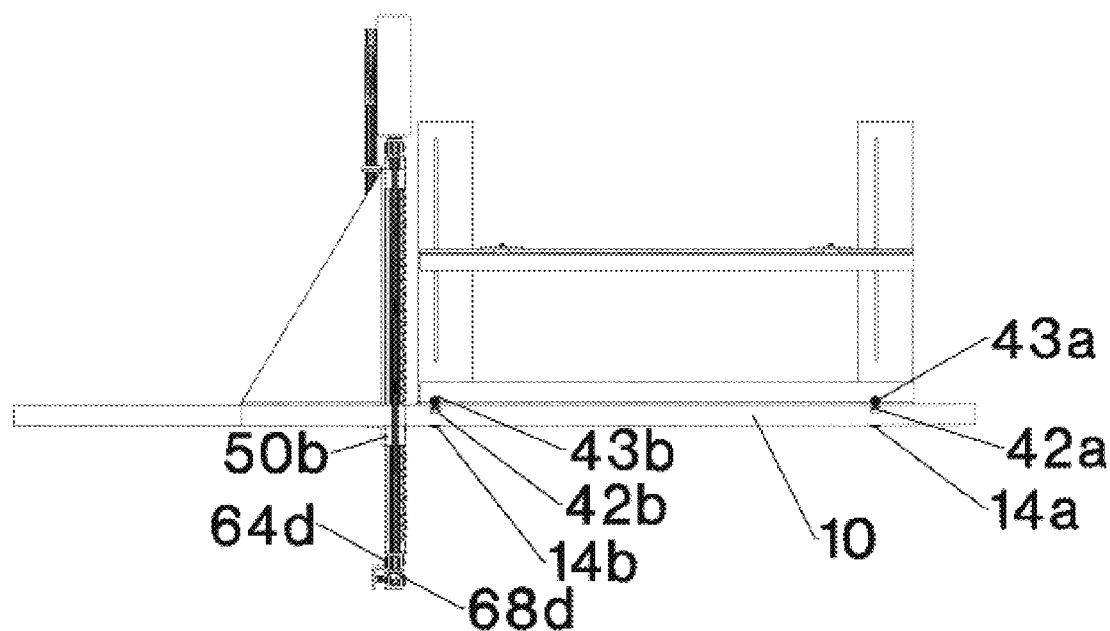
FIG. 3 shows an partial side view of this invention.
Figure 4:
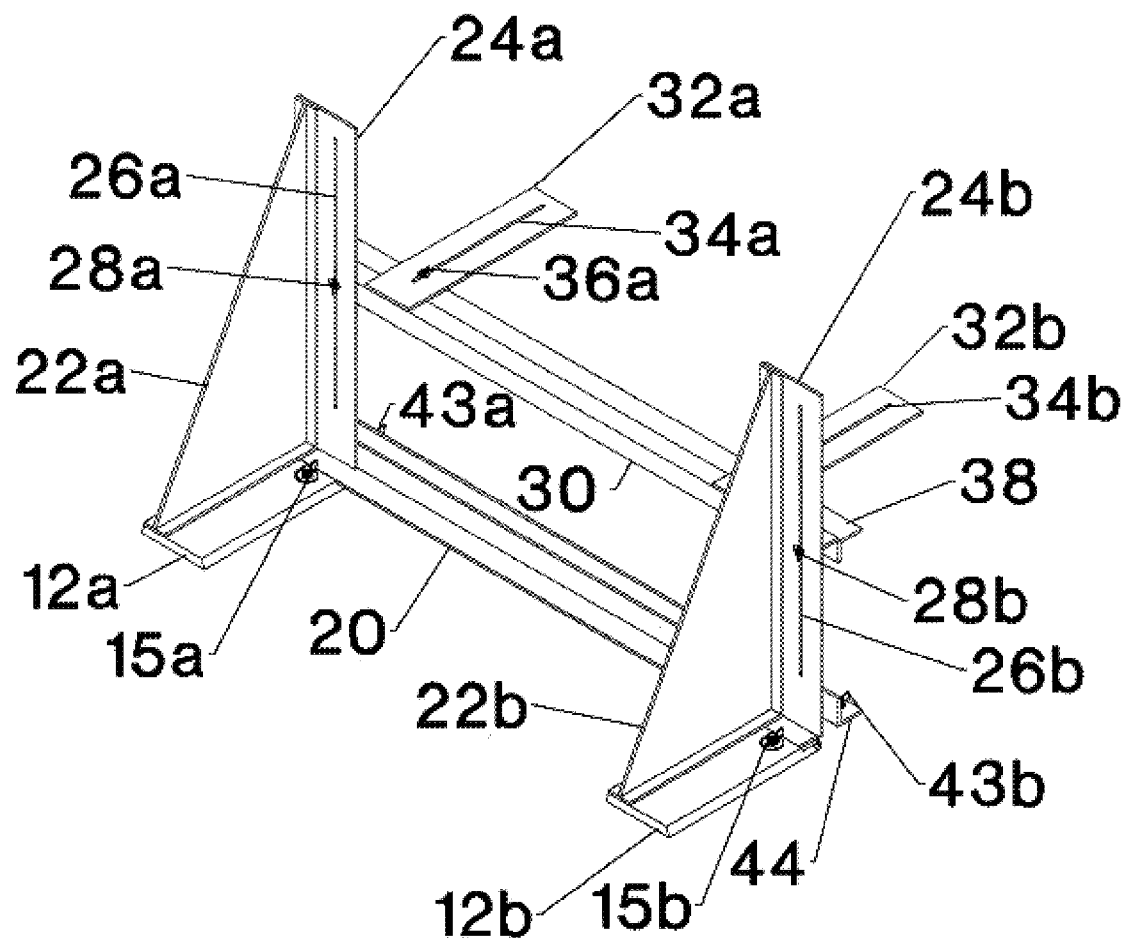
FIG. 4 shows an isometric view of the fence system separate from the base.
Figure 5:
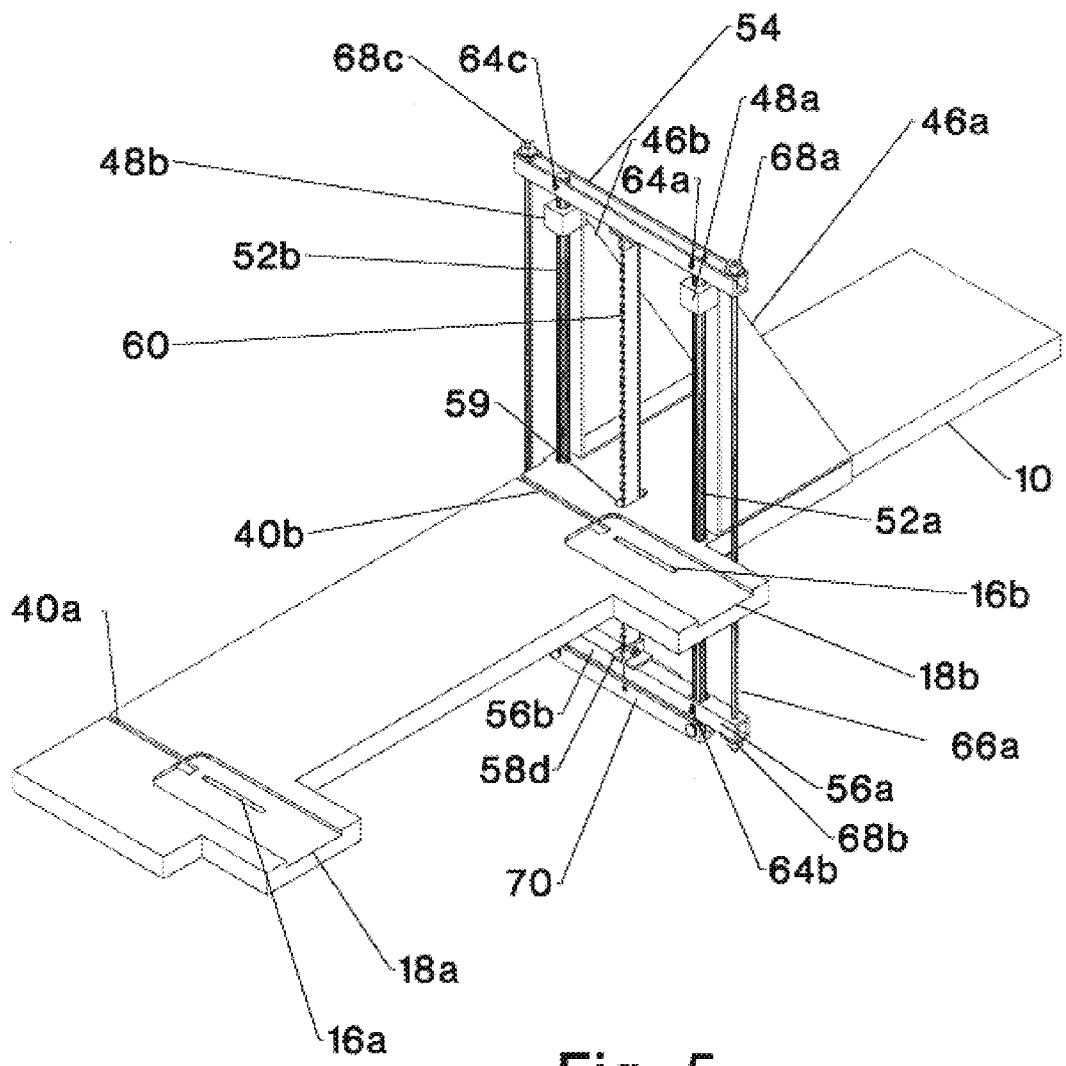
FIG. 5 shows an isometric view of the base and blade assembly separate from the fence system with the drive mechanism, guard, and after-cut support removed.

A preferred embodiment of the saw of the present invention is illustrated in FIG. 1 (isometric), FIG. 2 (end view), FIG. 3 (partial side view), and partial isometric views on FIG. 4 and FIG. 5. A wide range of suitable materials are available from which the components of the saw can be made including, but not limited to, aluminum, steel, wood, plastic, and composites. The size of the saw and motor requirements would depend on the width it is intended to cut. A range sizes could be produced to satisfy various needs.

The saw has a base 10 that provides support to fence assembly slides 12a and 12b. Slides 12a and 12b are secured to base 10 using fence assembly slide locking bolts 14a and 14b. Bolts 14a and 14b extend through fence assembly slide locking bolt slots 16a and 16b (FIG. 5). Bolts 14a and 14b are lag bolts. The square ends are inserted into slots 16a and 16b to restrain bolts 14a and 14b from rotating. Bolts 14a and 14b extend through holes in slides 12a and 12b. Wing nuts or knobs, fence assembly slide locking nuts 15a and 15b, on bolts 14a and 14b are used to lock slides 12a and 12b in anywhere within a range of positions. Slides 12a and 12b have corresponding fence assembly grooves 18a and 18b (FIG. 5) in base 10. Grooves 18a and 18b maintain slides 12a and 12b at right angles to the cutting direction. Grooves 18a and 18b are dovetailed to match slides 12a and 12b in order to assist in holding a long work piece in position down on base 10 while the cutting thickness is set and bolts 14a and 14b are not secured.

Fence assembly components are illustrated on FIG. 4. A lower fence 20 is rigidly connected to both slides 12a and 12b in order to keep fence 20 in line with the cutting direction. Slides 12a and 12b have corresponding upper fence supports 24a and 24b held rigidly in place at right angles to slides 12a and 12b by fence support brackets 22a and 22b, respectively. Supports 24a and 24b have corresponding upper fence height adjustment slots 26a and 26b. Upper fence height adjustment screws 28a and 28b extend through slots 26a and 26b, respectively, into threaded holes in an upper fence 30. Fence 30 has angle iron shape in order to contact a work piece along one side and one edge. The height of slots 26a and 26b determine the range of distance that can be set between base 10 and fence 30. Upper outer fence supports 32a and 32b are rigidly attached to fence 30. Supports 32a and 32b have corresponding upper outer fence adjustment slots 34a and 34b. Upper outer fence adjustment screws 36a and 36b extend through slots 34a and 34b, respectively, into threaded holes in an upper outer fence 38. By adjusting the position of fence 30 and fence 38 using screws 28a, 28b, 36a, and 36b, faces of fence 30 and fence 38 contact two sides at one edge and one edge of a work piece continuously along the length of fence 30 and fence 38. Screws 28a, 28b, 36a, and 36b are configured to allow adjustment by hand.

Base 10 has lower outer fence locking bolt grooves 40a and 40b. Grooves 40a and 40b each allow the head of a square or hex head bolt, lower outer fence locking bolts 42a and 42b, to slide within a range of positions without rotating. Grooves 40a and 40b are configured to allow bolts 42a and 42b to slide in from an end while being restrained from pulling out of base 10 when tightened. Bolts 42a and 42b extend out through grooves 40a and 40b in base 10, through holes in a lower outer fence 44 into corresponding lower outer fence locking nuts 43a and 43b. Nuts 43a and 43b are configured to allow adjustment by hand. By tightening nuts 43a and 43b, fence 44 is held in position on base 10. Together, base 10 and fences 20, 30, 38 and 44 guide both edges and both sides near the edges of the work piece as it is pushed in the cutting direction. Using the configuration described above, the work piece is held securely and can be released by an operator during the cutting process without causing any deviation in cutting alignment.

Blade Support Assembly

Bearing supports 46a and 46b are rigidly attached to base 10. Upper bearings 48a and 48b are attached to supports 46a and 46b. A bearing support brace 47 connects supports 46a and 46b to provide stiffness to maintain alignment of bearings 48a and 48b. Supports 46a and 46b transmit thrust generated by the cutting process from bearings 48a and 48b to base 10. Lower bearings 50a and 50b are connected directly to base 10.

A blade support assembly post 52a passes through bearings 48a and 50a. Similarly, a blade support assembly post 52b passes through bearings 48b and 50b. An upper blade support 54 connects to post 52a using a blade support assembly pin 64a and to post 52b using a blade support assembly pin 64c. A lower blade support 56a connects to post 52a using a blade support assembly pin 64b and a lower blade support 56b connects to post 52b using a blade support assembly pin 64d. A blade 60 passes through a blade opening 59 in base 10. A blade bracket 58a and a blade bracket 58c are rigidly attached to support 54. One end of blade 60 is held between brackets 58a and 58c by a blade locking bolt 62a and blade locking nut 63a. A blade bracket 58b is rigidly attached to support 56a and a blade bracket 58d is rigidly attached to support 56b. The other end of blade 60 is secured between bracket 58b and bracket 58d by a blade locking bolt 62b and a blade locking nut 63b. A blade tensioning rod 66a, threaded at both ends, passes through supports 54 and 56a on the side of supports 54 and 56a opposite blade 60 relative to post 52a. Similarly, a blade tensioning rod 66b, threaded at both ends, passes through supports 54 and 56b. A blade tensioning nut 68a is placed on rod 66a above support 54. A blade tensioning nut 68c is placed on rod 66b above support 54. A blade tensioning nut 68b is place on rod 66a below support 56a and is rigidly attached to both rod 66a and support 56a. A blade tensioning nut 68d is place on rod 66b below support 56b and is rigidly attached to both rod 66b and support 56b. By tightening nuts 68a and 68c the distance between support 54 and the side of supports 56a and 56b away from blade 60 decreases, thereby applying tension to blade 60. By using pins 64a, 64b, 64c, and 64d to connect supports 54, 56a, and 56b to posts 52a and 52b, posts 52a and 52b are in compression without moment. By not carrying moment in posts 52a and 52b, posts 52a and 52b remain straight and do not bind in bearings 48a, 48b, 50a, and 50b.

A blade assembly drive brace 70 is connected to posts 52a and 52b. Brace 70 is used to distribute the force from a source of reciprocating motion to posts 52a and 52b. A blade assembly consisting of brace 70, posts 52a and 52b, support 54, supports 56a and 56b, blade brackets 58a through 58d with corresponding nuts and bolts, blade 60, pins 64a through 64d, rods 66a and 66b and nuts 68a through 68d reciprocates as a unit. One means of delivering a reciprocating motion to brace 70 is illustrated on FIG. 1. This method consists of a motor 72, a belt 74, a cam assembly 76, a pivot arm 78, and a camshaft bearing support 80. Motor 72 is attached to a stand 92 using a means that allows tensioning of belt 74. Support 80 is attached to base 10 and includes the bearing for camshaft integral with cam assembly 76.

Base 10 is rigidly attached to stand 92. Stand 92 comprises all legs and braces necessary to support the saw and motor. Stand 92 may be secured to a floor or a board upon which an operator would stand. Either of these options counteracts a tendency of the saw to move in the cutting direction during the cutting process.

An after-cut support post 82a and an after-cut support post 82b are attached to base 10 through supports 46a and 46b. An after-cut support brace 84 is attached to posts 82a and 82b using after-cut support brace locking screws 86a and 86b. The position of brace 84 is adjustable and is set by the operator at a height equal to the width of the work piece. Brace 84 holds the work piece down to base 10 to restrain the work piece from oscillating motion induced by blade 60 after the work piece is clear of fence 30. A after-cut separator 88, the same width as blade 60 is attached to brace 84 such that separator 88 is in line with blade 60. Posts 82a and 82b extend above brace 47 to provide a location to attach a guard 90. Guard 90 provides a fixed enclosure into which the blade assembly reciprocates above the cutting height in order to protect the operator.

The distance between base 10 and blade brackets 58a and 58c at the closest point during blade assembly oscillation is set to be the same as the maximum distance between base 10 and fence 30 and the distance between base 10 and guard 90. This distance corresponds to the maximum width work piece for a particular configuration.

Operation of Invention

To operate the preferred embodiment of the invention, the thickness of cut is set by moving fence assembly slides 12a and 12b in fence assembly grooves 18a and 18b to the desired position. The distance between blade 60 and lower fence 20 perpendicular to the cutting direction determines the thickness. The position of slides 12a and 12b can be varied within a range allowed by bolts 14a and 14b in slots 16a and 16b. Slides 12a and 12b are secured to base 10 by tightening nuts 15a and 15b on bolts 14a and 14b.

An operator places a work piece on base 10 between fence 20, fence 44, fence 30 and fence 38. Fence 30 is lowered onto the work piece by allowing screws 28a and 28b to move within slots 26a and 26b in supports 24a and 24b. When in position with fence 30 resting on the work piece, an operator tightens screws 28a and 28b. Fence 38 is placed in position against the work piece by allowing screws 36a and 36b to move within slots 34a and 34b in supports 32a and 32b. With fence 38 resting against one side of the work piece with the other side resting against fences 20 and 30, an operator tightens screws 36a and 36b. After fence 44 is placed in position such that its face rest against the work piece, by allowing bolts 42a and 42b to travel in grooves 40a and 40b, an operator tightens nuts 43a and 43b. Brackets 22a and 22b hold supports 24a and 24b so that when the work piece is secured within fences 20, 30, 38, and 44 the sides of the work piece are perpendicular to base 10 throughout the cutting process.

An operator selects a blade 60 consistent with the material being cut. Blades of different materials, such as with or without carbide tipped teeth, with various height teeth, offset, thickness, and depth could be made available. A straight edge blade could be used for slicing veneer. The distance between brackets 58a and 58c and between brackets 58b and 58d are fixed for the thickest blade to be produced. Fixed shims are attached to the ends of thinner blades to match this thickness between brackets. Blade 60 is fed through opening 59. One end of blade 60 is placed between brackets 58a and 58c and the other end is placed between brackets 58b and 58d. Bolts 62a and 62b and nuts 63a and 63b are used to secure blade 60 to brackets 58a, 58b, 58c, and 58d. An operator tightens blade tensioning nuts 68a and 68c uniformly to place tensioning rods 66a and 66b in tension. This causes blade supports 56a and 56b to move closer to support 54 at the location of rods 66a and 66b. As a result of support 56a pivoting on blade support assembly pin 64b through post 52a and support 56b pivoting on pin 64d through post 52b, blade 60 is placed in tension.

An operator pushes the work piece so that it is near blade 60. After-cut support brace 84 is placed in position such that its underside is just above the work piece. Screws 86a and 86b are tightened to secure brace 84 onto posts 82a and 82b. An operator verifies that guard 90 is in place and attached firmly.

An operator, wearing safety goggles, applies power to motor 72 (switch, optional variable speed controller, and power cord not shown). Motor 72 drives belt 74 to impart rotational motion on cam assembly 76. Pivot arm 78 transmits reciprocating motion from cam assembly 76, being supported by camshaft bearing support 80, to blade assembly drive brace 70. Blade support posts 52a and 52b reciprocate within upper bearings 48a and 48b and lower bearings 50a and 50b. Bearing support brace 47 stabilizes bearing supports 46a and 46b. As the operator pushes the work piece onto blade 60, cutting takes place. The thrust of the work piece onto blade 60 is transmitted from blade 60 through brackets 58a and 58b to supports 54, 56a, and 56b. Supports 54, 56a, and 56b transmit the thrust to posts 52a and 52b which then impart it through bearings 48a and 48b through supports 46a and 46b, and through bearing 50a and 50b, to base 10. Base 10 is attached to stand 92. Stand 92 is either attached to the floor or to a board on which the operator stands.

Conclusion, Ramifications, and Scope of Invention

Thus the reader will see that the resaw of the invention provides an economical tool for cutting wide boards of lumber into thinner boards of the same width and length as the original work piece. This invention provides woodworking hobbyists with a practical means to accomplish a task that prior art required use of more complex and expensive equipment.

While this above description contains many specificities, these should not be construed as limitations on the scope of the invention, but rather as an exemplification of one preferred embodiment thereof. Many other variations are possible. For example, though the preferred embodiment uses two, a base could support one or more fence assembly slides that maintain alignment of a fence or guide assembly and provide a means to secure a fence or guide assembly in place. A wide range of sizes and materials could be used for a base and other components, depending on specific fence configuration and intended work piece size. All fasteners described above for use in securing fence components in place could be quick-release type fasteners instead of threaded ones. Also, alternative groove and slot shapes, sizes and configurations are possible. For example, instead of grooves 18a and 18b overlapping slides 12a and 12b, a single non-overlapping slide could be used and the fastening mechanism could be relied upon to hold said slide on said base. Also, instead of tee shaped grooves 40, slots through base 10 could be provided as a means to secure fence 44 to base 10.

As an alternative to using bolts 14a and 14b and nuts 15a and 15b to secure slides 12a and 12b to base 10, grooves 18a and 18b could be relied upon to hold slides 12a and 12b onto base 10. A positioning device, such as a threaded stem attached to a fence assembly and a rotating collar around said stem linked to a base, to control the position of a fence assembly could be used to adjust and hold cutting thickness.

The embodiment of the the invention shown on the illustrations uses straight, rigid fence components of suitable metal, plastic or composite material. This limits the resaw to cutting straight, uniform boards of uniform thickness. As an option, instead of an outer fence as illustrated, rollers held against the work piece with springs could be used. This would allow boards with one uneven face to be cut.

Alternatives to the illustrated blade support assembly and bearing configuration are also available. For example, instead of separate upper and lower bearings, one continuous bearing sleeve on each side could be used. Also, instead of having a system of dual posts in bearings, a single C-shaped bar with a typical hacksaw configuration could be used, where tensioning mechanisms pull the blade toward the ends of the C-shape. Use of a C-shaped blade support could be used with a rigid bearing assembly that prevents blade support assembly rotation, or a bearing assembly in-line with the blade to transmit thrust on the blade to a base. Such an alternative bearing configuration could consist of rollers against the back edge of the blade or bearings on other surfaces attached to a C-shaped blade support assembly.

The shape of the blade in the illustrations has opposing clean-out teeth that cut during the upward stroke, though the majority of cutting takes place during the downward stroke. Other blade configurations could be used, including blades that cut only during the downward stroke. One option would be to set a blade at a slight cant with the upper end toward a fence assembly. In this way, the blade would pull away from the work piece during the upward stroke, the work piece could be pushed forward unobstructed and the blade would reengage with the work piece again during the downward strike.

The reciprocating drive mechanism illustrated represents one simplified, but functional, configuration. Any type of reciprocating drive mechanism could be linked to a blade support assembly to provide the operating motion.

Accordingly, the scope of the invention should be determined not by the embodiment illustrated, but by the adopted claims and their legal equivalents.

I claim:

1. A resaw comprising:
    (a) a fence assembly having a set of guide elements that are adjustable so that faces of said guide elements are held by said fence assembly onto both sides and one edge of the work piece being cut;
    (b) a base having a means for securing said fence assembly such that said fence assembly and said base restrain the work piece from motion except in the direction parallel to a face or faces of said guide elements and the face of said base in contact with the work piece;
    (c) a guide system integral to said base which provides a means to maintain alignment of said fence assembly such that said fence assembly is capable of being positioned within a range of locations relative to said base as said fence assembly is adjusted for various work piece sizes and resulting cut thickness while maintaining a unique direction relative to said base and a face or faces of said guide elements attached or integral to said fence assembly when secured to said base;
    (d) a blade support assembly held by bearings attached to said base for restricting said blade assembly to reciprocating motion;
    (e) a controllable source of reciprocating motion connected to said blade assembly; and
    (f) a blade held by said blade assembly such that the sides of said blade are parallel to a face or faces of said guide elements attached or integral to said fence assembly secured to said base;

whereby said fence assembly keeps the work piece aligned with said blade while the work piece is being moved toward the reciprocating blade, thereby cutting the work piece into two uniformly thick pieces of the same length and width as the original work piece.

2. The resaw of claim 1 wherein said base, said fence assembly, and said blade support assembly are composed of rigid materials.

3. The resaw of claim 2 wherein a brace extends across the location of the work piece after having been cut, said brace being adjustable in height with a means of securing said brace in position, whereby said brace restrains the work piece from upward motion after having been cut.

4. The resaw of claim 3 wherein a separator of approximately the same thickness as the blade is connected to said brace, such that said separator extends into the gap in the work piece resulting from having been cut.

5. The resaw of claim 2 wherein said fence assembly comprises:
    (a) at least one slide that is capable of motion within a groove or grooves in said base perpendicular to the direction that the work piece is fed toward said blade assembly, the width and number of said slide(s) matching the width and number of said groove(s), and
    (b) a means of securing said slide(s) to said base that allows the motion defined above when not secured.

6. The resaw of claim 5 wherein said slide(s) are restrained from upward motion out of said grooves by the shape of said slide(s) and said groove(s).

7. The resaw of claim 5 wherein said fence assembly includes:
    (a) a lower fence rigidly attached to one end of said slide(s) such that the face of said lower fence away from said slide(s) is parallel to the direction that the work piece is fed toward said blade assembly;
    (b) a fence support bracket and an upper fence support rigidly attached to the top of said slide(s) such that said upper fence support is held perpendicular to the top of said slide(s); and
    (c) a means of attaching an upper fence to said upper fence support, at any height within a range suitable for a range of work piece widths, such that the face of said upper fence away from said upper fence support lies in the same plane as the face of said lower fence away from said slide.

8. The resaw of claim 7 wherein one face of said upper fence is parallel to said base, whereby one edge of the work piece is in contact with said base while the opposite edge of the work piece prior to being cut is in contact with said upper fence.

9. The resaw of claim 7 wherein said fence assembly includes:
    (a) at least one upper outer fence support attached to said fence assembly using a means whereby the position of said upper outer fence support is above said upper fence; and
    (b) an upper outer fence or guide(s) attached to said upper outer fence support(s) such that said upper outer fence or guide(s) can be fastened in position with a bearing surface on the face of the work piece, within a range of practical work piece thickness, opposite the common plane of said upper fence and said lower fence.

10. The resaw of claim 7 wherein said fence assembly includes a lower outer fence or guide(s) securable to said base such that a bearing surface of said lower outer fence or guide(s) can be in contact with the face of the work piece opposite the common plane of said upper fence and said lower fence.

11. A blade assembly comprising:
    (a) two posts, one end of each said posts attached to one of two blade supports with pin type connections such that moment is not transferred from said blade support to said post;
    (b) a blade connected to both said blade supports, between said posts, such that the ends of the blade are restrained from twisting;
    (c) two rods with adjustable fasteners on at least one end, said fasteners when adjusted being capable of reducing the distance between the ends of said blade supports on the ends away from said blade, thereby placing said rods and said blade in tension and said posts in compression; and
    (d) a means of connecting said blade assembly to a controllable source of reciprocating motion.

12. The blade assembly of claim 11 wherein at least one of two said blade supports consists of two separable parts connectable by a fastener through the portion of each said blade support that prevents the end of said blade from twisting and said blade, thereby allowing the distance between said blade supports at said blade to increase without excessive moment in said blade support consisting of two separable parts.

13. The blade assembly of claim 12 wherein said posts are comprised of material compatible in shape and composition with bearings through which said posts oscillate.

14. The blade assembly of claim 13 wherein the top of said blade is canted toward the work piece being cut such that said blade lifts away from said work piece during the stroke away from said base and, engages the work piece during the stroke toward said base, the work piece having been moved toward said blade during the stroke.

15. The blade assembly of claim 12 wherein said posts are held by a set of bearings and bearing supports attached to said base.

16. The blade assembly of claim 15 wherein said set of bearing and supports restricts the motion of said posts to the direction of reciprocation in-line with the axis of said posts.

17. The blade assembly of claim 16 wherein said blade passes through an opening in said base.

18. The blade assembly of claim 16 wherein a brace rigidly connects said set of bearings and supports at a height above said base corresponding to the maximum intended work piece width, thereby adding rigidity.

19. A resaw comprising:
    (a) a base having a top, an in-feed end, and an out-feed end whereby the work piece being cut is supported on said base while an operator moves the work piece from said in-feed end to said out-feed end;
    (b) one or more slides restrained by the shape of said base to allow motion of slides only perpendicular to the cutting direction where the cutting direction is the direction the work piece is moved from said in-feed end to said out-feed end;
    (c) a means to secure each said slide to said base anywhere within a range of positions;
    (d) a fence assembly on said in-feed end of said base comprising:
        (i) a lower fence rigidly attached to each said slide such that a face of said lower fence remains parallel to the cutting direction while the position of each said slide is adjusted;
        (ii) an upper fence support and an upper fence support bracket rigidly attached to each said slide whereby said upper fence support is perpendicular to said base when each said slide is secure to said base;
        (iii) an upper fence adjustable in position such that a face of said upper fence when secured to said upper fence support is in the same plane as said face of said lower fence parallel to the cutting direction; and
        (iv) a means of restraining the work piece of any thickness within a range such that one face of the work piece is held against said lower fence and said upper fence with one edge on said base and the other edge being restrained from motion away from said base, thereby allowing motion of the work piece only in line with the cutting direction; and
    (e) a blade assembly consisting:
        (i) a blade fixed at two ends that passes through an opening in said base between said in-feed end and said out-feed end;
        (ii) a means of tensioning said blade;
        (iii) a means of restraining the ends of said blade from twisting; and
        (iv) a support and bearing configuration restraining said blade to reciprocating motion perpendicular to said base while maintaining said blade inline with the cutting direction when pressure on said blade is transferred to said base; and
    (f) a controllable source of reciprocating motion connected to said blade assembly.

* * * * *